(12) United States Patent
Ehrnsperger et al.

(10) Patent No.: US 6,500,337 B1
(45) Date of Patent: Dec. 31, 2002

(54) DEVICE FOR OIL REMOVAL AND TRANSPORT

(75) Inventors: Bruno Johannes Ehrnsperger, Frankfurt (DE); Dana Paul Gruenbacher, Fairfield, OH (US); Mattias Schmidt, Idstein (DE); Andrew Julian Wnuk, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/720,164
(22) PCT Filed: Jun. 29, 1999
(86) PCT No.: PCT/US99/14644
§ 371 (c)(1), (2), (4) Date: Dec. 20, 2000
(87) PCT Pub. No.: WO00/00702
PCT Pub. Date: Jan. 6, 2000

(30) Foreign Application Priority Data

Jun. 29, 1998 (WO) ................................ PCT/US98/13497
Jun. 29, 1998 (WO) ................................ PCT/US98/13521
Jun. 29, 1998 (WO) ................................ PCT/US98/13523
Jun. 29, 1999 (WO) ................................ PCT/US98/13449

(51) Int. Cl.[7] ............................................. B01D 61/00
(52) U.S. Cl. ............... 210/258; 210/242.2; 210/923; 210/263; 210/321.84; 210/644

(58) Field of Search .................................. 210/650, 644, 210/500.36, 242.2, 923, 637, 321.6, 258, 321.84, 263

(56) References Cited

U.S. PATENT DOCUMENTS

| | | | |
|---|---|---|---|
| 4,778,601 A | * 10/1988 | Lopatin et al. |
| 4,780,211 A | * 10/1988 | Lien |
| 5,387,207 A | 2/1995 | Dyer et al. |
| 5,451,325 A | * 9/1995 | Herkenberg |
| 5,563,179 A | 10/1996 | Stone et al. |
| 5,632,737 A | 5/1997 | Stone et al. |
| 5,674,917 A | 10/1997 | Wilson |
| 5,688,075 A | * 11/1997 | Gradek |
| 5,834,385 A | 11/1998 | Blaney et al. |
| 5,885,451 A | 3/1999 | Porrovecchio, Sr. |
| 6,146,535 A | * 11/2000 | Sutherland |

FOREIGN PATENT DOCUMENTS

| DE | 195 38 014 A1 | 4/1997 |
|---|---|---|
| EP | 0 340 763 B1 | 11/1989 |

* cited by examiner

*Primary Examiner*—Ana Fortuna
(74) *Attorney, Agent, or Firm*—Caroline Wei-Berk; Ken K. Patel; Steven W. Miller

(57) ABSTRACT

A device of oil removal and transport comprising a bulk material having an inlet region and an outlet region, which is in liquid communication with a reservoir. A membrane is hermitically sealed to or about the inlet region, wherein the membrane is liquid permeable and has an average pore size not greater than 100 micrometers. The invention also relates to a method of oil removal and transport using this device.

12 Claims, 1 Drawing Sheet

DEVICE FOR OIL REMOVAL AND TRANSPORT

FIELD OF THE INVENTION

The present invention relates to a method and device for removing oil, for example removing oil spills either from hard surfaces or from floating on a body of water, by both absorbing and transporting the oil, optionally via a pump, to a holding tank or reservoir.

U.S. Pat. No. 5,834,385, issued on Nov. 10, 1998, discloses a nonwoven hydrophobic web which encases an absorbent core, the whole article being of use to dear up oil spills. Pore sizes of the nonwoven hydrophobic web are not disclosed, U.S. Pat. No. 5,885,451, issued on Mar. 23, 1999, discloses a fibrous material (fabric, paper, sponge, sheet or film) which is impregnated or coated with oleophylic, hydrophobic composition. The fibrous material is used to absorb oil which may then be wrung out of the material in order to recover the oil for storage, for example on board a ship, so that the material can then be reused.

Both of these prior art oil absorbent articles are designed to absorb oil, for example from a spill, and when saturated with oil, the absorbent article is removed from the oil source or spill, and either simply discarded or destroyed, e.g. by burning, or else the oil is squeezed out of the apparatus so that the apparatus might be reused and/or so that the oil might be recovered. Squeezing the oil out of the apparatus, such as illustrated in FIG. 14 of U.S. Pat. No. 5,885,451, is a cumbersome, time-consuming and expensive operation.

It is an object of the present invention to remove oil from an oil source or spill by continuously extracting the oil from the oil source or spill and transporting it to a holding reservoir or tank. Such a process would be much more economical than the prior art processes of removing the oil from the saturated absorbent article, and would enable much quicker removal of oil. Quick removal of the oil is a very important factor especially in the case of oil spillage at sea or in a port following an emergency such as an oil discharge from an oil tanker. In recent years such discharges, especially accidents involving oil tankers at sea, have had a detrimental effect on the maritime environment and wildlife, and attempts to clean up such discharges have been very expensive and only partially successful.

One aspect of the present invention provides a method comprising the steps of: absorbing the oil into a bulk material, the bulk material having an inlet region and an outlet region, by passing the oil into the inlet region of the bulk material through a membrane; and removing the oil from the outlet region of the bulk material. A second aspect of the present invention provides an oil removal and transport device comprising a bulk material, the bulk material comprising an inlet region and an outlet region.

SUMMARY OF THE INVENTION

The method of the present invention uses a membrane having an average pore size not greater than 100 micrometers so that the oil is continuously transported through the membrane into the inlet region of the bulk material and continuously removed from the outlet region of the bulk material into a reservoir.

The device of the present invention comprises a reservoir which is in liquid communication with the outlet region and the device further comprises a membrane hermetically sealed to or about the inlet region, the membrane being liquid permeable and having an average pore size not greater than 100 micrometers.

Preferably the membrane is oleophylic and has a bubble point pressure of at least 1 kPa, preferably from 2 kPa to 100 kPa, and more preferably from 8 kPa to 50 kPa, when measured at ambient temperature and pressure using 0.03% solution of Triton X-100 in distilled water as the standard test liquid.

DETAILED DESCRIPTION OF THE INVENTION

Figure 1:
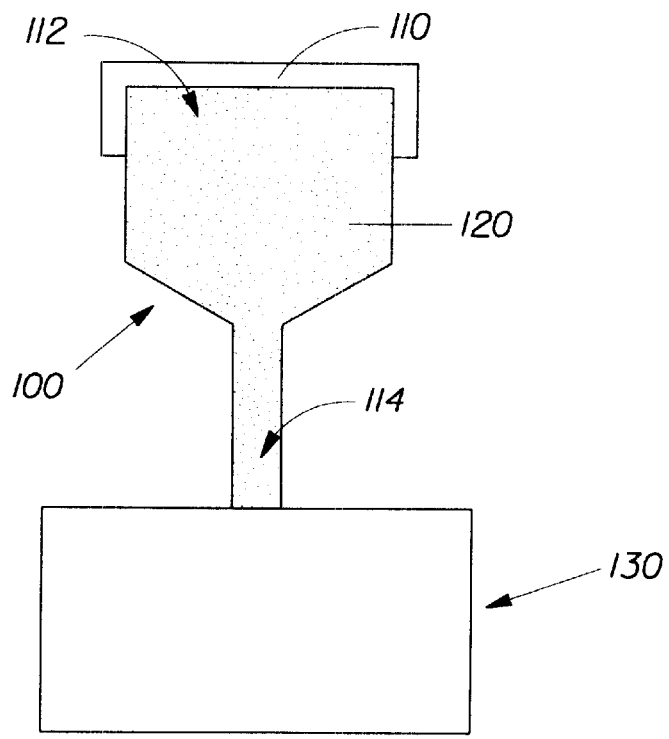
FIG. 1 is a schematic representation of an embodiment of the device of the present invention.

The method and device of the present invention work on the principle of a "closed distribution system". By "closed distribution system" it is meant herein that a membrane is saturated (e.g. with oil or oil and water mixture) and that air is prevented from entering the system even under vacuum, provided the vacuum pressure does not exceed the bubble point pressure of the membrane. Liquid can then be drawn across the membrane into the closed distribution system, and then rapidly transported to a outlet port where the liquid is continuously removed from the system. In the closed distribution system the vacuum can be maintained at the same time as liquid is being drawn into the system in an inlet region and expelled from the system at an outlet region. The effect of the vacuum is that the liquid can be transported across the membrane and through the bulk material much faster than in prior art processes. Furthermore the method of the invention is a continuous process.

The term "hermetically sealed" as used herein means that a gas (especially air) can neither pass from the outside environment to the inside of the reservoir or liquid conduit; nor from the inside of the reservoir or liquid conduit to the outside environment, when the membrane is saturated with liquid as long as the pressure differential across the membrane does not exceed the bubble point pressure. In particular the seal between membrane and the liquid conduit prevents the device from leakage of gas across the sealed region.

The membrane has an average pore size of no more than 100 micrometers, preferably no more than 50 micrometers, more preferably no more than 10 micrometers, and most preferably of between 5 micrometers and 50 micrometers. It is further preferred that the pore size distribution is such that 95% of the pores have a size of no more than 100 micrometers and preferably no more than 50 micrometers.

The membrane preferably has an average thickness of no more than 100 micrometers, preferably no more than 10 micrometers, and most preferably of no more than 5 micrometers.

The term "oleophilic" as used herein refers to materials having a receding contact angle for the oily liquid to be transported less than 90 degrees, preferably less than 70 degrees, more preferably less than 50 degrees, even more preferably less than 20 degrees, and most preferably less than 10 degrees.

The term "liquid conduit" as used herein refers to any suitable pipe or tube or any other geometric structure acting as means for liquid transport. The liquid conduit may have flexible walls (e.g. polypropylene tube), or may have inflexible walls (e.g. glass tube).

In one aspect, the present invention is concerned with a liquid transfer device which is based upon direct suction rather than on capillarity. Therein, the liquid is transported through a region into which substantially no air (or other gas) should enter (at all, or at least not in a significant amount). The driving force for liquid flowing through such a device can be created by a liquid sink or liquid source in liquid communication with the transport device, either externally or internally. The direct suction is maintained by ensuring that substantially no air or gas enters the liquid transport device during transport. This means that the membrane should be substantially air impermeable up to a certain pressure, namely the bubble point pressure. Thus, a liquid transport device must have a certain liquid permeability. A higher liquid permeability provides less flow resistance, and thus is preferred from this point of view.

However, for conventional porous liquid transport materials, those materials that function based on capillary transport mechanisms (also referred to herein as "bulk materials"), liquid transport is generally controlled by the interaction of pore size and permeability, such that open, highly permeable structures will generally be comprised of relatively large pores. These large pores provide highly permeable structures, however these structures have very limited wicking heights for a given set of respective surface energies, i.e., a given combination of type of material and liquids. Pore size can also affect liquid retention under normal use conditions.

In contrast to such conventional capillary governed mechanisms, in the present invention, these conventional limitations have been overcome, as it has been surprisingly found that materials exhibiting a relatively lower permeability (e.g. "membrane") can be combined with material exhibiting a relatively higher permeability (e.g. "bulk materials"), and the combination provides significant synergistic effects.

In particular, it has been found that when a highly liquid permeable material having large pores filled with liquid is surrounded by a material having essentially no air permeability up to a certain pressure, the bubble point pressure, but having also relatively low liquid permeability, the combined liquid transport device will have a high liquid permeability and a high bubble point pressure at the same time, thus allowing very fast liquid transport even against external pressure.

In a particular aspect of the present invention, a siphon effect is used to transport liquid to the point of end-use. The liquid conduit is kept substantially full of liquid, and the membrane is saturated. Liquid can pass through the membrane, either into or out of the device, but air is prevented from entering the siphon because air cannot pass across the saturated membrane. In this way the siphon effect is maintained. The driving pressure to move-liquid along the siphon can be obtained via a variety of mechanisms. For example, if the inlet is at a higher position than the outlet, gravity will generate a hydrostatic pressure difference generating liquid flow through the system. Alternatively, if the outlet port is higher than the inlet port, and the liquid has to be transported against gravity, the liquid will flow through this siphon only if an external pressure difference larger than the hydrostatic pressure difference is applied. For example, a pump, such as a peristaltic pump, could generate enough suction or pressure to move liquid through this siphon. Thus, liquid flow through a siphon or pipe is caused by an overall pressure difference between its inlet and outlet port region. This can be described by well known models, such as expressed in the Bernoulli equation.

Alternatively absorbent materials such as an absorbent gelling material or a capillary material may be used to create the driving pressure.

Figure 2:
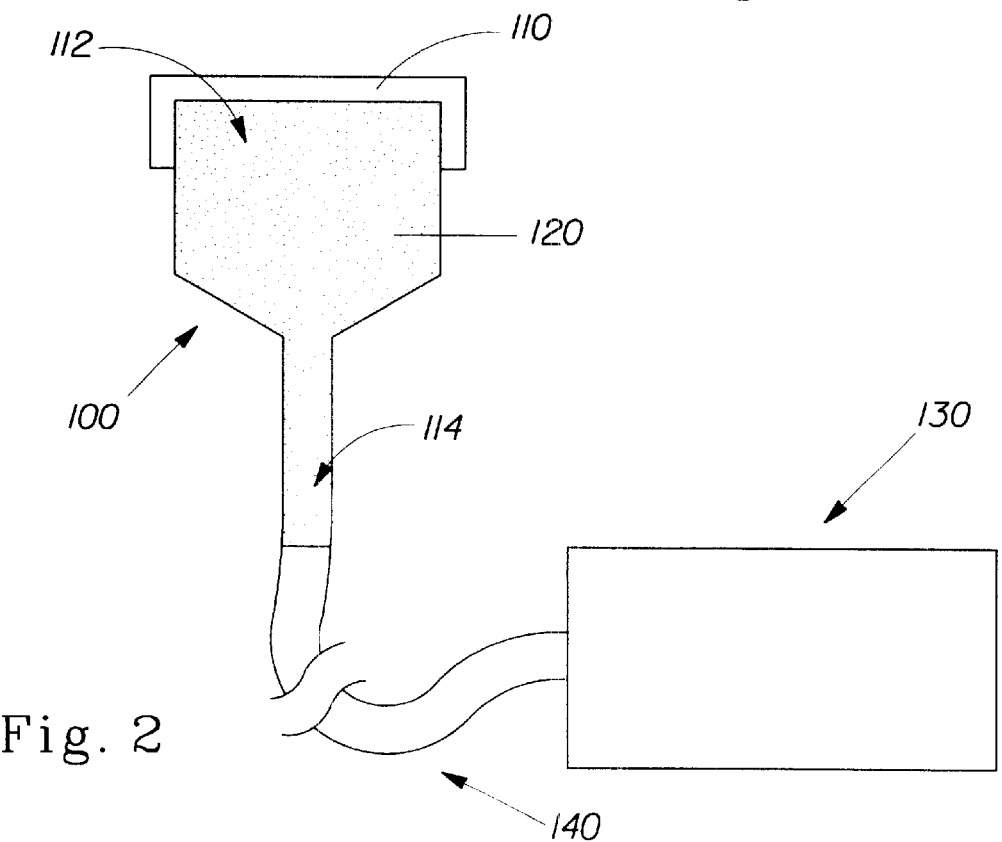
FIG. 2 is a schematic representation of another embodiment of the device of the present invention.

FIG. 1 shows an embodiment of the device of the present invention. The device 100 comprises a reservoir 130, which is in liquid communication with the outlet region 114 of the bulk material 120 and a membrane 110 hermetically sealed to or about the inlet region 112 of the bulk material 120. FIG. 2 shows another embodiment of the present invention, wherein the outlet region 114 is connected to and is in liquid communication with reservoir 130 via a liquid conduit 140.

Bulk Material

A key requirement for the bulk region is to have a low average flow resistance, such as expressed by having a permeability k of at least $10^{-11}$ m$^2$, preferably more than $10^{-8}$ m$^2$, more preferably more than $10^{-7}$ m$^2$, and most preferably more than $10^{-5}$ m$^2$. One important means to achieve such high permeabilities for the bulk materials can be achieved by utilizing material providing relatively high porosity. Such a porosity, which is commonly defined as the ratio of the volume of the materials that makes up the porous materials to the total volume of the porous materials, and as determined via density measurements commonly known, should be at least 50%, preferably at least 80%, more preferably at least 90%, or even exceeding 98%, or 99%. In the extreme of the bulk material essentially consisting of a single pore, void space, the porosity approaches or even reaches 100%.

The bulk material can have pores, which are larger than about 200 μm, 500 μm, 1 mm or even 9 mm in diameter or more. Such pores may be smaller prior to the fluid transport, such that the bulk material may have a smaller volume, and expand just prior or at the liquid contact. Preferably, if such pores are compressed or collapsed, they should be able to expand by a volumetric expansion factor of at least 5, preferably more than 10. Such an expansion can be achieved by materials having an elastic modulus of more than the external pressure which, however, must be smaller than the bubble point pressure. High porosities can be achieved by a number of materials, well known in the art as such. For example fibrous members can readily achieve such porosity values. Non-limiting examples for such fibrous materials that can be comprised in the bulk region are high-loft non-wovens, e.g., made from polyolefin or polyester fibers as used in the hygienic article field, or car industry, or for upholstery or HVAC industry. Other examples comprise fiber webs made from cellulosic fibers.

Such porosities can further be achieved by porous, open celled foam structures, such as, without intending any limitation, for example polyurethane reticulated foams, cellulose sponges, or open cell foams as made by the High Internal Phase Emulsion Polymerization process (HIPE foams), all well known from a variety of industrial applications such as filtering technology, upholstery, hygiene and so on. Such porosities can be achieved by wall regions which circumscribe voids defining the bulk material, such as exemplified by pipes. Alternatively, several smaller pipes can be bundled. Such porosities can further be achieved by "space holders", such as springs, spacer, particulate material, corrugated structures and the like. The bulk material pore sizes or permeabilities can be homogeneous throughout the bulk material, or can be inhomogeneous.

It is not necessary, that the high porosity of the bulk material is maintained throughout all stages between manufacture and use of the liquid transport device, but the voids within the bulk material can be created shortly before or during its intended use. For example, bellow like structures held together by suitable means can be activated by a user, and during its expansion, the liquid penetrates through a port region into the expanding bulk material, thereby filling the transport device completely or at least sufficiently to not hinder the liquid flow. Alternatively, open celled foam materials, such as described in (U.S. Pat. No. 5,563,179 or U.S. Pat. No. 5,387,207) have the tendency to collapse upon removal of liquid, and the ability to re-expand upon re-wetting. Thus, such foams can be transported from the manufacturing site to the user in a relatively dry, and hence thin (or low-volume), and only upon contact with the source liquid increase their volume so as to satisfy the void permeability requirements.

The bulk material can have various forms or shapes. The bulk material can be cylindrical, ellipsoidal, sheet like, stripe like, or can have any irregular shape. The bulk material can have constant cross-sectional area, with constant or varying cross-sectional shape, like rectangular, triangular, circular, elliptical, or irregular. A cross-sectional area is defined for the use herein as a cross-section of the bulk material, prior to addition of source liquid, when measured in the plane perpendicular to the flow path of the transport liquid, and this definition will be used to determine the average bulk material cross-sectional area by averaging the individual cross-sectional areas all over the flow path(s).

The absolute size of the bulk material should be selected to suitably match the geometric requirements of the intended use. Generally, it will be desirable to have the minimum dimension for the intended use. The benefit of the designs according to the present invention is to allow much smaller cross-sectional areas than conventional materials. The dimensions of the bulk material are determined by the permeability of said bulk material, which can be very high, due to possible large pores, as the bulk material does not have to be designed under the contradicting requirements of high flux (i.e. large pores) and high vertical liquid transport (i.e. small pores). Such large permeabilities allow much smaller cross-sections, and hence very different designs.

Also the length of the bulk material can be significantly larger than for conventional systems, as also with regard to this parameter the novel transport device can bridge longer distances and also greater vertical liquid transport heights.

The bulk material can be essentially non-deformable, i.e. maintains its shape, form, volume under the normal conditions of the intended use. However, in many uses, it will be desirable, that the bulk material allows the complete device to remain soft and pliable. The bulk material can change its shape, such as under deforming forces or pressures during use, or under the influence of the fluid itself. The deformability or absence thereof can be achieved by selection of one or more materials as the bulk material (such as a fibrous member), or can be essentially determined by the circumscribing regions, such as by the wall regions of the transport device. One such approach is to utilize elastomeric materials as the wall material.

The voids of the bulk material can be confined by wall regions only, or the bulk material can comprise internal separations therein. If, for example, the bulk material is made up of parallel pipes, with impermeable cylindrical walls, these would be considered to be such internal separations, thereby possibly creating pores which are unitary with the inner, hollow opening of the pipes, and possibly other pores created by the interstitial spaces between the pipes. If, as a further example, the bulk material comprises a fibrous structure, the fiber material can be considered to form such internal separations.

The internal separations of the bulk material can have surface energies adapted to the transported liquid. For example, in order to ease wetting and/or transport of oily liquids, the separations or parts thereof can be oleo- or lipophilic.

The confining separations of the bulk material may further comprise materials which significantly change their properties upon wetting, or which even may dissolve upon wetting. Thus, the bulk material may comprise an open cell foam material having a relatively small pore at least partially being made of soluble material, such as polyvinylalcohol or the like. The small porosity can draw in liquid at the initial phase of liquid transport, and then rapidly dissolve so as to then leave large voids filled with liquid. Alternatively, such materials may fill larger pores, completely or partially. For example, the bulk material can comprise soluble materials, such as poly(vinyl) alcohol or poly(vinyl) acetate. Such materials can fill the voids, or support a collapsed state of the voids before the device is contacted with liquid. Upon contact with liquid, such as oil or water, these materials may dissolve and thereby create empty or expanded voids.

In one embodiment, the voids of the bulk material may be filled with a liquid. The liquid in the bulk material may be of the same type as the liquid intended to be transported by the device. For example, in a device intended for oil removal and transport, the bulk material may be filled with oil.

Mechanically expanding elements; such as springs or which can open void space in the structure if the expansion direction is oriented such that the appropriate pore size is also oriented along the flow path direction, may be used. Such materials are well known in the art, and for example disclosed in U.S. Pat. Nos. 5,563,179, 5,387,207, 5,632,737 all relating to HIPE foam materials, or in U.S. Pat. No. 5,674,917 relating to absorbent foams, or in EP-A-0 340 763, relating to highly porous fibrous structures or sheets, such as made from PET fibers. Other materials having relatively large pores are highloft non-woven, filter materials as open cell foams from Recticel in Brussel, Belgium such as Bulpren, Filtren (Filtren TM10 blue, Filtren TM20 blue, Filtren TM30 blue, Filtren Firend 10 black, Filtren Firend 30 black, Filtren HC 20 grey, Filtren Firend HC 30 grex, Bulpren S10 black, Bulpren S20 black, Bulpren S30 black). Another material having relatively large pores, even though the porosity is not particularly high, is sand with particles larger than 1 mm, specifically sand with particles larger than 5 mm. Such fibrous or other materials may, for example, become very useful by being corrugated; however, excessive compression should be avoided. Excessive compression can result in a non-homogeneous pore size distribution with small pores within the web, and insufficiently open pores between the corrugations.

Membrane

The term "membrane" as used herein is generally defined as a material or region that is permeable for liquid, gas or a suspension of particles in a liquid or gas. The membrane may for example comprise a microporous region to provide liquid permeability through the capilliaries. Once wetted, however, gases (e.g. air) will essentially not pass through the membrane if the driving pressure is below a threshold pressure commonly referred to as "bubble point pressure". Oleophilic microporous membranes will transport oil or oil-based liquids. A hydrophobic but oleophilic microporous membrane will therefore be permeable for oil but not for water and can be used to transport oil, or to separate oil and water. This property is particularly useful for cleaning oil spills from bodies of water such as lakes or open sea.

Membranes are often produced as thin sheets, and they can be used alone or in combination with a support layer (e.g. a nonwoven) or in a support element (e.g. a spiral holder). Other forms of membranes include but are not limited to polymeric thin layers directly coated onto another material, bags corrugated sheets.

Further known membranes are "activatable" or "switchable" membranes that can change their properties after activation or in response to a stimulus. This change in properties might be permanent or reversible depending on the specific use. For example, a hydrophobic microporous layer may be coated with a thin dissolvable layer e.g. made from poly(vinyl)alcohol. Such a double layer system will be impermeable to gas. However, once wetted and the poly (vinyl)alcohol film has been dissolved, the system will be permeable for gas but still impermeable for liquid.

Another useful membrane parameter is the permeability to thickness ratio, which in the context of the present invention is referred to as "membrane conductivity". This reflects the fact that, for a given driving force, the amount of liquid penetrating through a material such as a membrane is on one side proportional to the permeability of the material, i.e. the higher the permeability, the more liquid will penetrate, and on the other side inversely proportional to the thickness of the material. Hence, a material having a lower permeability compared to the same material having a decrease in thickness, shows that thickness can compensate for this permeability deficiency (when regarding high rates as being desirable). Typical k/d for an oil (or grease) transport or separation device according to the present invention is from about $1 \times 10^{-9}$ to about $500 \times 10^{-9}$ m, preferably from about $100 \times 10^{-9}$ to about $500 \times 10^{-9}$ m. Preferably the k/d is at least $1 \times 10^{-7}$ and more preferably at least $1 \times 10^{-5}$ m.

For a porous membrane to be functional once wetted (permeable for liquid, not-permeable for air), at least a continuous layer of pores of the membrane always need to be filled with liquid and not with gas or air. Therefore either the device needs to be kept in contact with liquid or evaporation of the liquid from the membrane pores must be minimized, either by a decrease of the vapour pressure in the liquid or by an increase in the vapour pressure of the air.

As noted hereinabove the method and device of the present invention is particularly useful for cleaning oil spills from bodies of water such as lakes or open sea. It is highly desirable to separate, as completely as possible, the oil from the water so that subsequent treatment and disposal can be carried out on a smaller volume of highly oil-rich liquid, rather than a comparatively large volume of a dilute oil and water mixture. In a most preferred embodiment of the present invention the device effectively separates oil from water, for example, by selection of a suitable oleophilic and hydrophobic membrane.

Test Method: Bubble Point Pressure (Membrane)

The following procedure applies when it is desired to asses the bubble point pressure of a membrane.

First, the membrane material is connected with a plastic funnel (available from Fischer Scientific in Nidderau, Germany, catalog number 625 617 20) and a length of tube. The funnel and the tube are connected in an air tight way. Sealing can be made with Parafilm M (available from Fischer Scientific in Nidderau, Germany, catalog number 617 800 02). A circular piece of membrane material, slightly larger than the open area of the funnel, is sealed in an air tight way with the funnel. Sealing is made with suitable adhesive, e.g. Pattex from Henkel KGA, Germany). The lower end of the tube is left open i.e. not covered by a membrane material. The tube should be of sufficient length, i.e. up to 10 m length may be required.

In case the test material is very thin, or fragile, it can be appropriate to support it by a very open support structure (as e.g. a layer of open pore non-woven material) before connecting it with the funnel and the tube. In case the test specimen is not of sufficient size, the funnel may be replaced by a smaller one (e.g. Catalog #625 616 02 from Fisher Scientific in Nidderau). If the test specimen is too large size, a representative piece can be cut out so as to fit the funnel.

The testing liquid can be the transported liquid (i.e. oil or grease), but for ease of comparison, the testing liquid should a solution 0.03% TRITON X-100, such as available from MERCK KGaA, Darmstadt, Germany, under the catalog number 1.08603, in distilled or deionized water, thus resulting in a surface tension of 33 mN/m.

Whilst keeping the lower (open) end of the funnel within the liquid in the reservoir, the part of the funnel with the membrane is taken out of the liquid. If appropriate, but not necessarily, the funnel with the membrane material should remain horizontally aligned.

Whilst slowly continuing to raise the membrane above the reservoir, the height is monitored, and it is carefully observed through the funnel or through the membrane itself (optionally aided by appropriate lighting) if air bubbles start to enter through the material into the inner of the funnel. At this point, the height above the reservoir is registered to be the bubble point height.

From this height H the Bubble point pressure BPP is calculated as: $BPP = \rho \cdot g \cdot H$ with the liquid density $\rho$, gravity constant g (g~9.81 m/s$^2$).

In particular for bubble point pressures exceeding about 50 kPa, an alternative determination can be used, such as commonly used for assessing bubble point pressures for membranes used in filtration systems. Therein, the membrane is separating two liquid filled chambers, when one is set under an increased gas pressure (such as an air pressure), and the point is registered when the first air bubbles "break through".

Determination of Pore Size

Optical determination of pore size is especially used for thin layers of porous system by using standard image analysis procedures know to the skilled person.

The principle of the method consists of the following steps: 1) A thin layer of the sample material is prepared by either slicing a thick sample into thinner sheets or if the sample itself is thin by using it directly. The term "thin" refers to achieving a sample caliper low enough to allow a clear cross-section image under the microscope. Typical sample calipers are below 200 $\mu$m. 2) A microscopic image is obtained via a video microscope using the appropriate magnification. Best results are obtained if about 10 to 100 pores are visible on said image. The image is then digitized by a standard image analysis package such as OPTIMAS by BioScan Corp. which runs under Windows 95 on a typical IBM compatible PC. Frame grabber of sufficient pixel resolution (preferred at least 1024×1024 pixels) should be used to obtain good results. 3) The image is converted to a binary image using an appropriate threshold level such that the pores visible on the image are marked as object areas in white and the rest remains black. Automatic threshold setting procedures such as available under OPTIMAS can be used. 4) The areas of the individual pores (objects) are determined. OPTIMAS offers fully automatic determination of the areas. 5) The equivalent radius for each pore is determined by a circle that would have the same area as the pore. If A is the area of the pore, then the equivalent radius is given by $r = (A/\pi)^{1/2}$. The average pore size can then be determined from the pore size distribution using standard statistical rules. For materials that have a not very uniform pore size it is recommended to use at least 3 samples for the determination.

Optionally commercially available test equipment such as a Capillary Flow Porometer with a pressure range of 0–1380 kPa (0–200 psi), such as supplied by Porous Materials, Inc, Ithaca, N.Y., US model no. CFP-1200AEXI, such as further described in respective user manual of February 1997, can also be used to determine bubble point pressure, pore size and pore size distribution.

Determination of Caliper

The caliper of the wet sample is measured (if necessary after a stabilization time of 30 seconds) under the desired compression pressure for which the experiment will be run by using a conventional caliper gauge (such as supplied by AMES, Walftham, Mass., US) having a pressure foot diameter of 1⅛" (about 2.86 cm), exerting a pressure of 0.2 psi (about 1.4 kPa) on the sample, unless otherwise desired.

Determination of Permeability and Conductivity

Permeability and conductivity are conveniently measured on commercially available test equipment.

For example, equipment is commercially available as a Permeameter such as supplied by Porous Materials, Inc, Ithaca, N.Y., US under the designation PMI Liquid Permeameter. This equipment includes two Stainless Steel Frits as porous screens, also specified in said brochure. The equipment consists of the sample cell, inlet reservoir, outlet reservoir, and waste reservoir and respective filling and emptying valves and connections, an electronic scale, and a computerized monitoring and valve control unit. A detailed explanation of a suitable test method using this equipment is also given in the applicants co-pending application PCT/US98/13497, filed on Jun. 29, 1998 (attorney docket no. CM1841FQ).

Hydrostatic Head

In this test an adjustable head of distilled water on the top side of a membrane having an area of about 64 cm$^2$ is increased until visible water appears on the opposite side of the sample. The hydrostatic head where water first appears to transfer through the sample is recorded as the hydrostatic head for that sample.

A test specimen is cut to about 10 cm by 10 cm and placed over a sample plate having dimensions of about of 10 cm by 10 cm with a centered O-ring seal having a diameter of about 8 cm. The sample plate has a centered opening having a diameter of about 7.6 cm to allow observation of the bottom side of the sample during the test. The sample plate is carefully positioned under a 7.6 cm inner diameter Perspex column that is about 1 m tall, with a mounting flange so as to conveniently allow tightening of the sample plate carrying the sample underneath by means of screws. Optionally, a mirror may be positioned under the opening in the sample plate to ease the observation.

The cylinder has an sideways oriented opening with a diameter of about 1 cm to allow connection with a pump. The opening enters the column about 1 cm above where the sample is mounted. Optionally, a three-way-valve can be mounted in this connection to allow easier emptying of the column after the test.

The pump is set to raise the liquid head in the cylinder to a height of 25.4 cm within 60±2 seconds after the pump is turned on.

After starting of the pump the condition of the bottom surface of the test specimen is monitored. When the first drop falls off the test specimen, the pump is immediately stopped, and the height in the column is recorded in millimeters.

For each material, five tests should be repeated and the results should be averaged.

EXAMPLES

Example 1

A membrane is hermetically sealed over the wide end of a laboratory glass funnel. The narrow end of a funnel is connected to a pipe which, in turn was connected to the inlet side of a pump. Suitable pipe is Tygon Vacuum R-3603 from Norton Performance Plastic Corp. of Akron, Ohio, having an internal diameter of 7 mm and a length of about 30 cm. The pump is a liquid metering pump, digital pump no. G-07523-20 having easy load pump head no. G-07518-02 from Cole Parmer Instrument Co. of Ill., USA. The membrane is made from polyamide, has an average pore size of 20 micrometers, an open area of 14%, a caliper of 55 micrometers and is manufactured by Sefar Inc., of Ruschlikon, Switzerland, number 03-20/14. The funnel and the pipe is filled with a polyurethane foam, manufactured by Reticel of Wetteren, Belgium, under the trade name TM10, having 10 pores per inch. The tube and funnel are filled with vegetable oil having a surface tension of 33 mNm$^{-1}$ and a viscosity of 65 mPa.s.

Example 2

The previous example is repeated with the membrane being replaced by a polyamide membrane having an average pore size of 100 micrometers, an open area of 47%, and a caliper of 78 micrometers. The membrane is manufactured by Sefar Inc., of Ruschlikon, Switzerland, number 03-100/47.

Example 3

The previous example is repeated with the membrane being replaced by a polypropylene membrane having an average pore size of 75 micrometers, an open area of 21%, and a caliper of 195 micrometers. The membrane is manufactured by Sefar Inc., of Ruschlikon, Switzerland, number 05-75/21. This execution was found to be particularly easy to activate and to remain stable.

Example 4

The membrane of Example 1 was replaced by a membrane made of a similar material which is coated with silicon to make it hydrophobic. The pump rate is adjusted so that the device absorbs oil selectively, rather than water.

In each of Examples 1 to 4 the device is used to rapidly remove oil either from a hard surface, or oil which is floating on the surface of water.

What is claimed is:

1. An oil removal and transport device comprising:
    a bulk material comprising an inlet region and an outlet region;
    a reservoir in liquid communication with the outlet region; and
    a membrane hermetically sealed to or about the inlet region, the membrane being liquid permeable and having an average pore size not greater than 100 micrometers;
   wherein a driving force to transport the oil is provided by an absorbent gelling material or a capillary material.

2. The device of claim 1, wherein the membrane is oleophilic.

3. The device of claim 1, wherein the membrane has a bubble point pressure of at least 1 kPa, when measured at ambient temperature and pressure using 0.03% solution of Triton X-100 in distilled water as the standard test liquid.

4. The device of claim 1, wherein the membrane has a bubble point pressure of from 8 to 50 kPa.

5. The device of claim 1, wherein the membrane has a membrane conductivity (k/d) of at least $1\times10^{-9}$ m.

6. The device of claim 5, wherein the membrane has a membrane conductivity (k/d) of from $1\times10^{-9}$ to $300\times10^{-9}$ m.

7. The device of claim 5, wherein the membrane has a membrane conductivity (k/d) of at least $1\times10^{-7}$ m.

8. The device of claim 5, wherein the membrane has a membrane conductivity (k/d) of at least $1\times10^{-5}$ m.

9. The device of claim 1, the device further comprises a pump to transport the oil continuously into the reservoir, wherein the pump is a peristaltic pump.

10. The device of claim 1, wherein the membrane is oleophilic and hydrophobic.

11. The device of claim 1, wherein the bulk material is substantially geometrically saturated with a first liquid prior to use.

12. The device of claim 11, wherein the first liquid is oil.

* * * * *